(12) United States Patent
Satou (10) Patent No.: US 8,978,711 B2
(45) Date of Patent: Mar. 17, 2015

(54) DOUBLE PIPE AND COUPLING STRUCTURE FOR THE PIPE

(75) Inventor: Susumu Satou, Outa (JP)

(73) Assignee: Watanabe Seisakusho Co., Ltd. (JP)

( * ) Notice: Subject to any disclaimer, the term of this patent is extended or adjusted under 35 U.S.C. 154(b) by 616 days.

(21) Appl. No.: 13/352,316

(22) Filed: Jan. 17, 2012

(65) Prior Publication Data

US 2013/0180616 A1 Jul. 18, 2013

(51) Int. Cl.
*F16L 9/19* (2006.01)

(52) U.S. Cl.
CPC ..................... *F16L 9/19* (2013.01)
USPC ............... 138/115; 138/114; 138/117

(58) Field of Classification Search
USPC ........................ 138/114, 115, 117
See application file for complete search history.

(56) References Cited

U.S. PATENT DOCUMENTS

| | | | | |
|---|---|---|---|---|
| 285,909 A * | 10/1883 | Marsden | ............... | 166/227 |
| 435,193 A * | 8/1890 | Steele | ............... | 138/115 |
| 1,833,543 A * | 11/1931 | Turner | ............... | 122/392 |
| 2,067,078 A * | 1/1937 | Faber | ............... | 4/211 |
| 2,929,408 A * | 3/1960 | Weatherwax et al. | ............... | 138/38 |
| 3,110,754 A * | 11/1963 | Witort et al. | ............... | 174/70 R |
| D345,197 S * | 3/1994 | Potter | ............... | D23/266 |
| 6,311,730 B2 * | 11/2001 | Penza | ............... | 138/98 |
| 6,460,574 B2 * | 10/2002 | Currie | ............... | 138/116 |
| 2009/0223455 A1 * | 9/2009 | Petterson et al. | ............... | 119/14.51 |

FOREIGN PATENT DOCUMENTS

JP    Sho-48(1973)-57715    7/1973

* cited by examiner

*Primary Examiner* — Patrick F Brinson
(74) *Attorney, Agent, or Firm* — Wallace G. Walter (57) ABSTRACT

When the common part of the outer pipe and the inner pipe is worked with the pressing-type punching-out work for connecting with the inner pipe, there occurs no possibility that any disadvantage caused by the punched-out debris is generated.

An inner pipe is arranged at the inside of an outer pipe. Each part of the outer pipe and the inner pipe is partially made common and integrally formed to each other. The inner pipe has the side walls extending from a common part of the outer pipe and the inner pipe to the diametral direction of the outer pipe in parallel and the recess wall facing the common part of the outer pipe and the inner pipe at a deep end of the side walls is not expanded more than the space between the side walls.

11 Claims, 10 Drawing Sheets

DOUBLE PIPE AND COUPLING STRUCTURE FOR THE PIPE

TECHNICAL FIELD OF INVENTION

This invention belongs to a technical field of a double pipe in which an inner pipe is installed within an outer pipe, wherein fluids such as liquid and gas or the like are flowed in each of the outer pipe and the inner pipe and belongs to the technical field of a coupling structure for the double pipe.

BACKGROUND OF INVENTION

In recent years, a double pipe has become popular in a wide variety of industrial fields in order to make a compact fluid flowing passage and various kinds of improvement have been carried out for a relative arrangement structure of an outer pipe and an inner pipe.

In the prior art, as a double pipe, a unit described in Patent Document 1, for example, has been known.

In the Patent Document 1 is described a double pipe in which an outer pipe and an inner pipe are integrally formed to each other through a metal bending work.

The double pipe described in the Patent Document 1 is made in such a way that each part of an outer pipe and an inner pipe is partially made common to reduce an amount of manufacturing material and its manufacturing cost is less-expensive. In addition, a common part of the outer pipe and the inner pipe is punched to enable a direct branched part connection in a direction perpendicular to an axial direction to be carried out at the inner pipe.

RELATED ART

Patent Document 1: Japanese Utility Model Unexamined Publication No. Sho-48 (1973)-57715

Disclosure of Invention

The double pipe described in the Patent Document 1 shows a problem that performing a pressing-type punching-out work not producing any debris at the common part of the outer pipe and the inner pipe for taking the branched part connection of the inner pipe, causes a punched-out debris to strike against the inner pipe in the case of a small size of the inner pipe, so that the inner pipe is damaged by the punched-out debris or the punched-out debris is press contacted with it or adhered to it, and in turn in the case of a larger-sized inner pipe, the punched-out debris is hidden by the inner corner of the inner pipe, so that a trouble-some removal of the punched-out debris occurs. Further, when the end port of the inner pipe is closed near the punched hole for performing the branched part connection, a useless space is formed between the closed end port of the inner pipe and the punched hole to cause fluid to be stayed there or disturbed, so that there remains a problem that fluid flowing characteristic is damaged.

This invention has been invented in view of such problems described above, and its first theme consists in providing a double pipe in which no problem caused under presence of punched-out debris occurs when a common part of an outer pipe and an inner pipe is operated with the pressing-type punching-out work for connecting with the inner pipe. In addition, its second theme consists in providing a coupling structure for double pipe in which its can be easily carried out branched part connection of an inner pipe of a double pipe is made that each part of an outer pipe and an inner pipe is partially made common without damaging flowing characteristic of fluid.

Means for Solving Problems

In order to solve the aforesaid first theme, a double pipe of this invention applies in which an inner pipe is arranged at the inside of an outer pipe and each part of the outer pipe and the inner pipe is partially made common and integrally formed to each other, wherein the inner pipe has side walls extending from the common part of the outer pipe and the inner pipe to a diametral direction of the outer pipe in parallel and a recess wall at a deep end of the side walls facing the common part of the outer pipe and the inner pipe is not expanded more than a space between the side walls.

This means provides to enable the punched-out debris generated at the common part of the outer pipe and the inner pipe operated in the diametral direction of the outer pipe to be smoothly guided toward its deep direction by the side walls and pushed against it under the pressing-type punching-out work and avoid its striking against the wall because the inner pipe has the side walls extending to the diametral direction of the outer pipe in parallel and further prevent the guided debris from being hidden at the corner part of the inner pipe because the recess wall of the inner pipe is not expanded more than a space between the side walls.

In addition, this means enables the inner pipe to be provided with an anti-pressure characteristic against fluid flowing inside part of the inner pipe so as to the recess wall of the inner pipe is a semi-circular shape of which sectional shape protrudes outward. Additionally, it is possible to prevent a narrow space from being formed at the each of the interface part between the side walls of the inner pipe and the outer pipe so as to the each of the interface part between the outer surface of the side walls of the inner pipe and the outer pipe is curved surface.

In order to solve the aforesaid second theme, the coupling structure for the double pipe of this invention applies means as follows:

a coupling structure for the double pipe is connecting to the double pipe, wherein an inner pipe is arranged at the inside of an outer pipe and each part of the outer pipe and the inner pipe is partially made common and integrally formed to each other, wherein the inner pipe has side walls extending from a common part of the outer pipe and the inner pipe to the diametral direction of the outer pipe in parallel and a recess wall at a deep end of the side walls facing the common part of the outer pipe and the inner pipe is not expanded more than a space between the side walls, the common part of the outer pipe and the inner pipe is punched to have a connecting hole, the hole is made as an incomplete punched hole having partially not-yet cut portion, a cutting piece formed the hole extends from the common part of the outer pipe and the inner pipe to protrude into the inside part of the inner pipe.

This means is operated such that the cutting piece formed with the hole for the branched part connection at the inner pipe is protruded from the common part of the outer pipe and the inner pipe to the inside part of the inner pipe, thereby the cutting piece closes a space formed between the closed end port of the inner pipe and the punched hole and acts as a flow regulating plate for preventing staying and dispersion of fluid. Additionally, the inner pipe is formed into a tunnel-shape by the side walls and the recess wall, when the connecting hole is punched there under the pressing-type punching-out work, the cutting piece is smoothly guided by the side walls toward a deep direction to avoid striking against any portions of the inner pipe, thereby a useless space is prevented from being formed by the recess wall that is not expanded more widely than the side walls.

In addition, this means enables the fluid passing through the inner pipe to be guided smoothly into the connecting hole because the cutting piece is inclined at an upstream side of flow of fluid in the inner pipe to have an acute angle against an axis of the hole. Further, it is possible to make a substantial complete closing of the space with the cutting piece by performing a brazing operation because the cutting piece is abutted against the side walls and the recess wall of the inner pipe.

Effects of Invention

The double pipe of this invention applies the effect of there occurs no possibility that any disadvantage caused by the punched-out debris is generated when the common part of the outer pipe and the inner pipe is operated with the pressing-type punching-out work for branched part connection with the inner pipe, under the means, to enable the punched-out debris generated at the common part of the outer pipe and the inner pipe operated in the diametral direction of the outer pipe to be smoothly guided toward its deep direction by the side walls and pushed against it under the pressing-type punching-out work and to avoid its striking against the wall because the inner pipe has the side walls extending to the diametral direction of the outer pipe in parallel, and further prevent the guided debris from being hidden at the corner part of the inner pipe because the recess wall of the inner pipe is not expanded more than a space between the side walls.

The coupling structure for the double pipe of this invention applies the coupling structure for the double pipe described in the Patent Document 1 to the technology of connecting the inner pipe of the double pipe described in the Patent Document 2, and has an effect capable of performing an easy branched part connection of the inner pipe of the double pipe is made that each part of the outer pipe and the inner pipe is partially made common without damaging a flowing characteristic of fluid because a cutting piece formed with a hole for a connection at the inner pipe is protruded from the common part of the outer pipe and the inner pipe to the inside part of the inner pipe, thereby the cutting piece closes a space formed between the closing end port of the inner pipe and the punched hole and acts as a flow regulating plate for preventing staying and dispersion of fluid. In addition, this invention has an effect capable of accurately inclining the cutting piece and arranging it in the inner pipe under the pressing-type punching-out work because the inner pipe is formed into a tunnel-shape by the side walls and the recess wall, when a connecting hole is punched there under the pressing-type punching-out work, the cutting piece is smoothly guided by the side walls toward a deep direction to avoid the striking against any portions of the inner pipe, thereby a useless space is prevented from being formed by the recess wall that is not expanded more widely than the side walls.

BEST MODE FOR CARRYING OUT INVENTION

The mode for carrying out the double pipe and the coupling structure for the pipe of this invention will be described according to the drawings as follows:

The mode for carrying out the double pipe of this invention will be described according to the FIG. 1 to FIG. 5.

FIG. 1 to FIG. 4 show the first example of the mode for carrying out the double pipe of this invention.

In the first example, the double pipe formed with the comparatively smaller diameter is preferably used such as a passage for refrigerant of a vehicle-mounted air conditioner.

Figure 1:
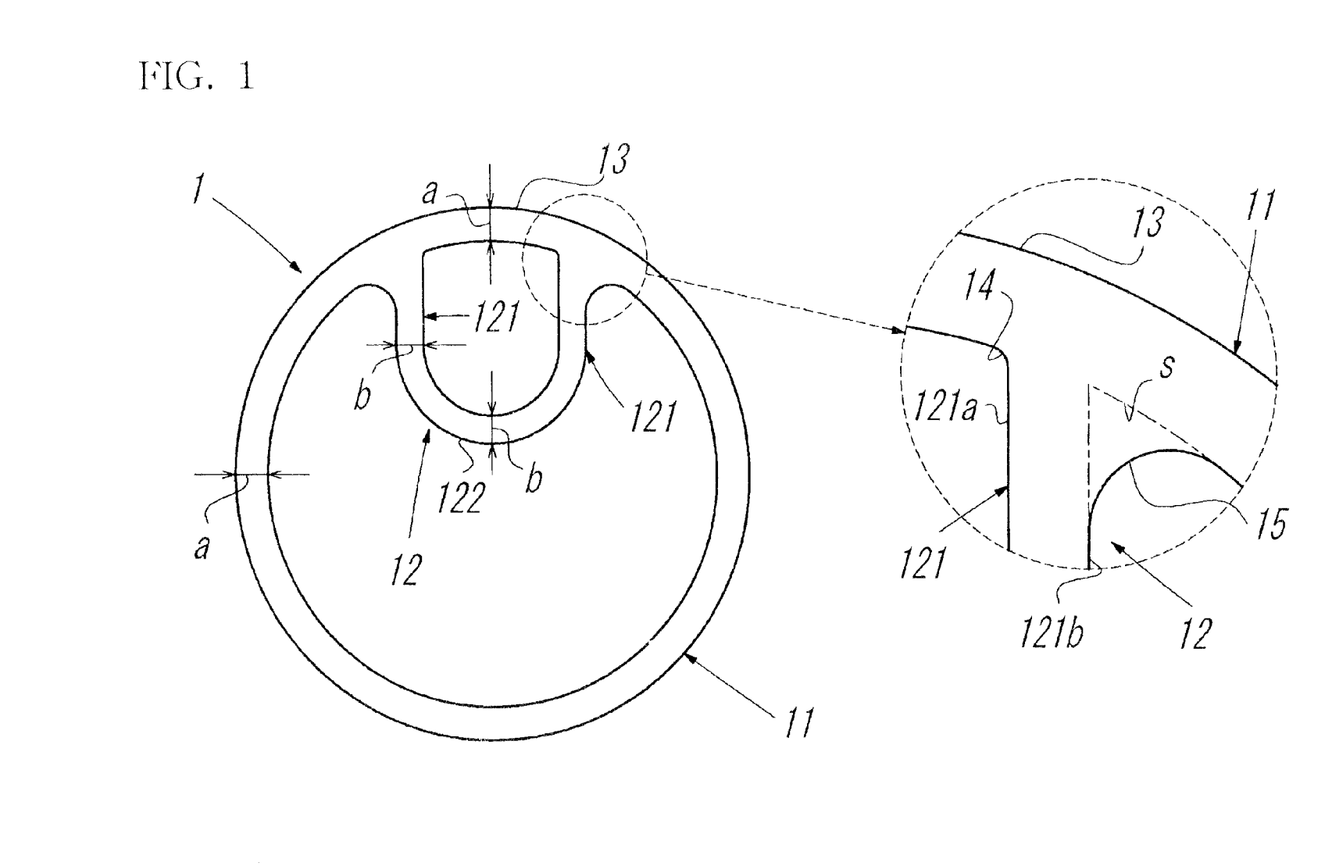
FIG. 1 is a front view (including a partial enlarged view) showing the first example of the mode for carrying out the double pipes of this invention.

In the first example, as shown in FIG. 1, the double pipe 1 comprises the outer pipe 11 and the inner pipe 12.

Figure 2:
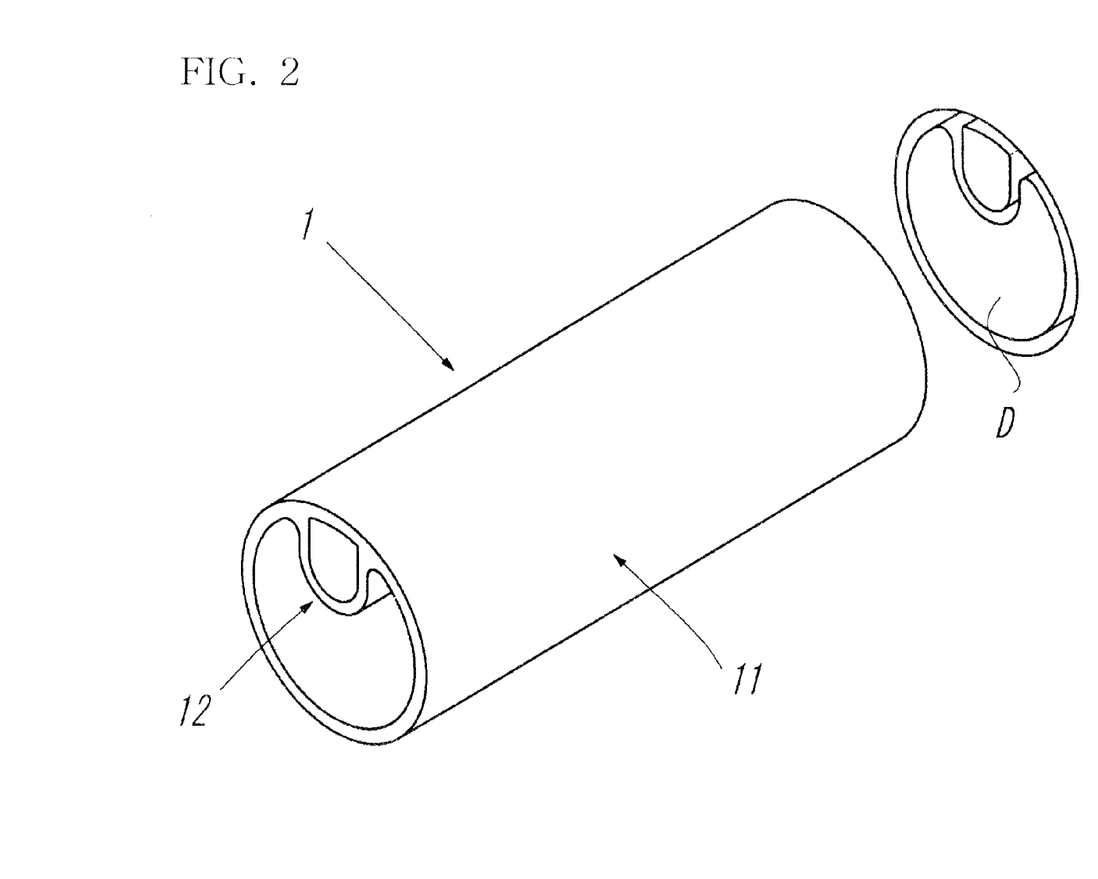
FIG. 2 is a perspective view showing the manufacturing example in FIG. 1.

As shown in FIG. 2, the outer pipe 11 and the inner pipe 12 are integrally formed by extruding in a linear manner aluminum-type metal material having super heat conduction through an extruding die D, and they are set in such a way that the inner pipe 12 is arranged at the inside of the outer pipe 11. In the case that the double pipe is used as the passage for refrigerant of the vehicle-mounted air conditioner, fluid flowing in the outer pipe 11 is gas gasified from refrigerant and fluid passing through the inner pipe 12 becomes refrigerant liquid. Accordingly, although the outer pipe 11 becomes a low pressure pipe and the inner pipe 12 becomes a high pressure pipe, they are set in such a way that a wall thickness-a of the outer pipe 11 becomes thicker than that of a wall thickness-b the inner pipe 12 in view of the entire rigidity. (refer to FIG. 1)

The outer pipe 11 is formed to show a perfect circle shape in its sectional shape.

As apparent from FIG. 1, the inner pipe 12 is formed in a tunnel shape, wherein a part of arc of the outer pipe 11 (the common part 13) is applied as a front wall, the side walls 121 of the inner pipe 12 extends from the common part 13 to the diametral direction of the outer pipe 11 in parallel and the recess wall 122 is faced on the side walls as a semi-circular shape of which sectional shape protrudes in a convex state outside (in a deep direction) against the common part 13 at the deep end of the side walls 121. Each of interface part between the inside surface 121a of the side walls 121 and the common part 13 is formed into a small curved surface 14 that is a minimum curved surface required for extrusion work. Each of interface part between the outside surface 121b of the side walls 121 and the outer pipe 11 is formed into a larger curved surface 15 than the small curved surface 14.

Figure 3A:
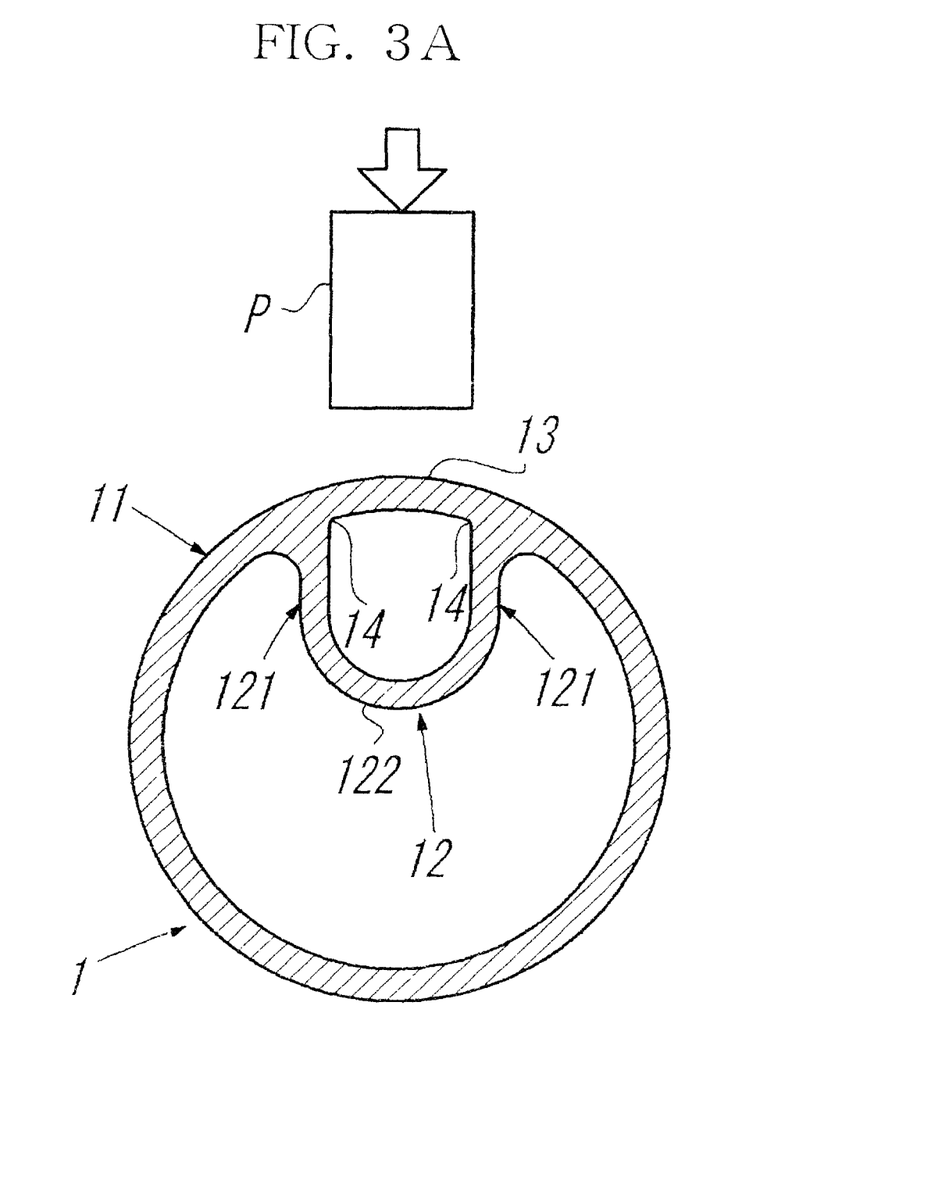
FIG. 3A is a cross sectional view of the example for punching-out work in FIG. 1 showing the mode before punch-out work.
Figure 3B:
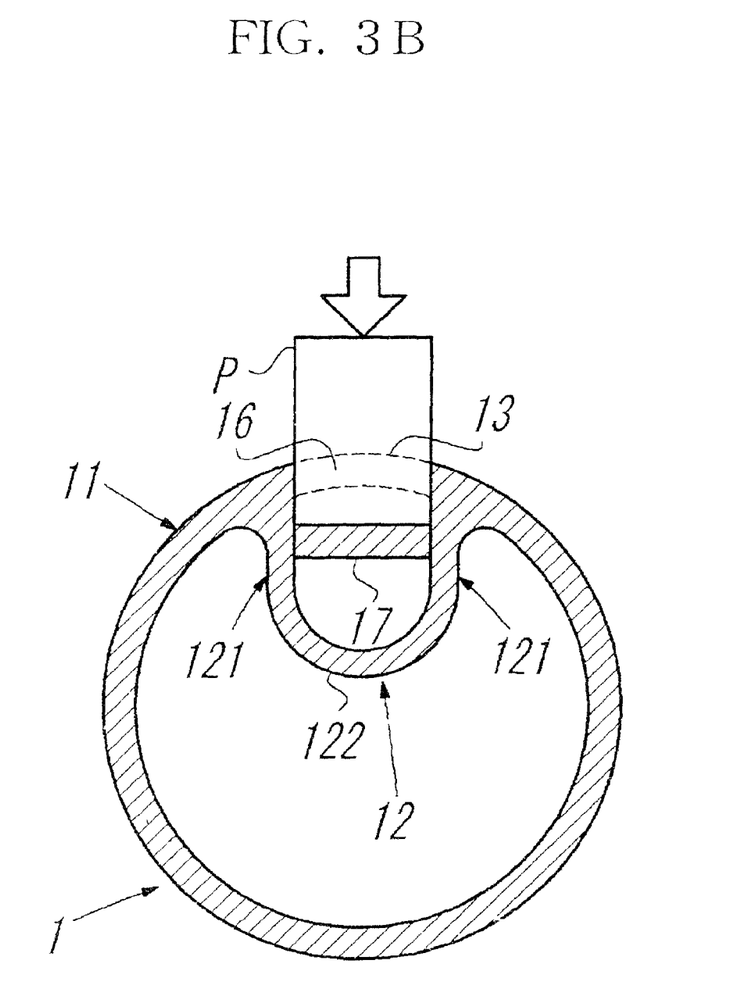
FIG. 3B is a cross sectional view of the example for punching-out work in FIG. 1 showing the mode having been punch-out work.

According to the first example, as shown in FIG. 3, a punch-P having a size in a range of space of the side walls 121 of the inner pipe 12 is properly selected when the pressing-type punching-out work is carried out for performing the branched part connection of the inner pipe 12 to the common part 13 of the outer pipe 11 and the inner pipe 12. The punch-P is operated to perform a pressing work from outside of the common part 13 toward the diametral direction of the outer pipe 11 as shown in FIG. 3A, to punch the hole 16 at the common part 13 and then the punched-out debris 17 generated during the punching work is pushed toward the deep direction (direction for the recess wall 122 of the inner pipe 12) as shown in FIG. 3B.

Figure 4:
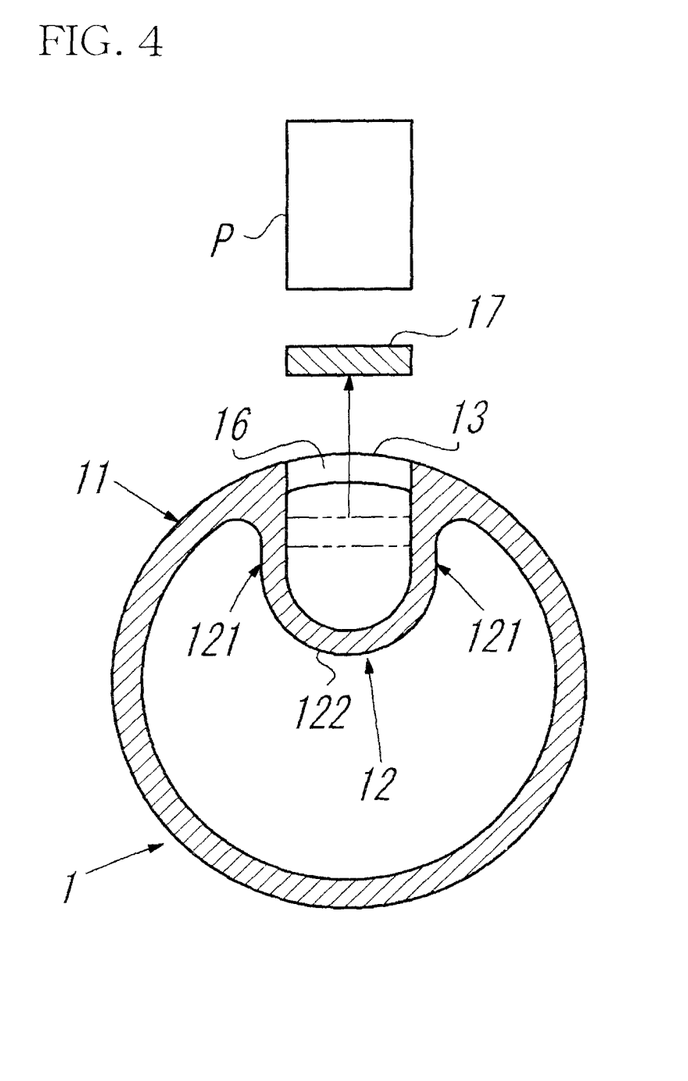
FIG. 4 is a cross sectional view of the example for punching-out work in FIG. 1 showing the mode of completion of punched out.

At this time, because the interface part between the inside surface 121a of the side walls 121 of the inner pipe 12 and the common part 13 is formed into the small curved surface 14 and the punch-P cutting stress may easily be concentrated, the common part 13 is easily cut and a hole 16 is positively formed. In addition, the inner pipe 12 is not damaged by the punched-out debris 17 or the punched-out debris 17 is not press contacted with inner pipe 12, because the punched-out debris 17 pushed by the punch-P is guided to slide on the inside surface 121a the side walls 121 of the inner pipe 12 at its both sides. The punched-out debris 17 is not hidden by the inner corner of the inner pipe 12 because there is provided a semi-circular shape in which the recess wall 122 positioned at a deep end of the side walls 121 of the inner pipe 12 is not expanded more than a space between the side walls 121. Due to this fact, as shown in FIG. 4, it is possible to discharge easily the punched-out debris 17 by injecting air and the like after retreating the punch-P.

Accordingly, when the common part 13 of the outer pipe 11 and the inner pipe 12 is operated with the pressing-type punching-out work for branched part connection with the inner pipe 12, there occurs no possibility that any disadvantage caused by the punched-out debris 17 is generated.

Further, when the first example is used, the function of the inner pipe 12 acting as a high pressure pipe can be positively assured since the recess wall 122 of the inner pipe 12 has the semi-circular shape and also has an anti-pressure characteristic.

Further, even if the pipe is twisted and arranged, the inner pipe 12 is not destroyed because the inner pipe 12 is arranged to support the recess wall 122 by the side walls 121 acting as two legs. Accordingly, it is possible to attain a degree of freedom at the pipe arrangement work.

Further, the each of the interface part between the outside surface 121b of the side walls 121 of the inner pipe 12 and the outer pipe 11 is formed with curved surfaces 15, and a flowing characteristic of fluid within the outer pipe 11 is not retarded since this structure is not formed with any narrow space S (see FIG. 1). In addition, the curved surface 15 reinforces the side walls 121 of the inner pipe 12 to realize an anti-twisting characteristic against the pipe arrangement to be twisted as described above and also contributes to increase an anti-pressure feature of the inner pipe 12.

Further, it is possible to attain a certain degree of freedom in a piping system of the connecting pipe connected to the inner pipe 12 and an arrangement of a connection flange and the like because the inner pipe 12 is to enable a direct branched part connection in a direction perpendicular to an axial direction of the outer pipe 11 to be carried out.

Figure 5:
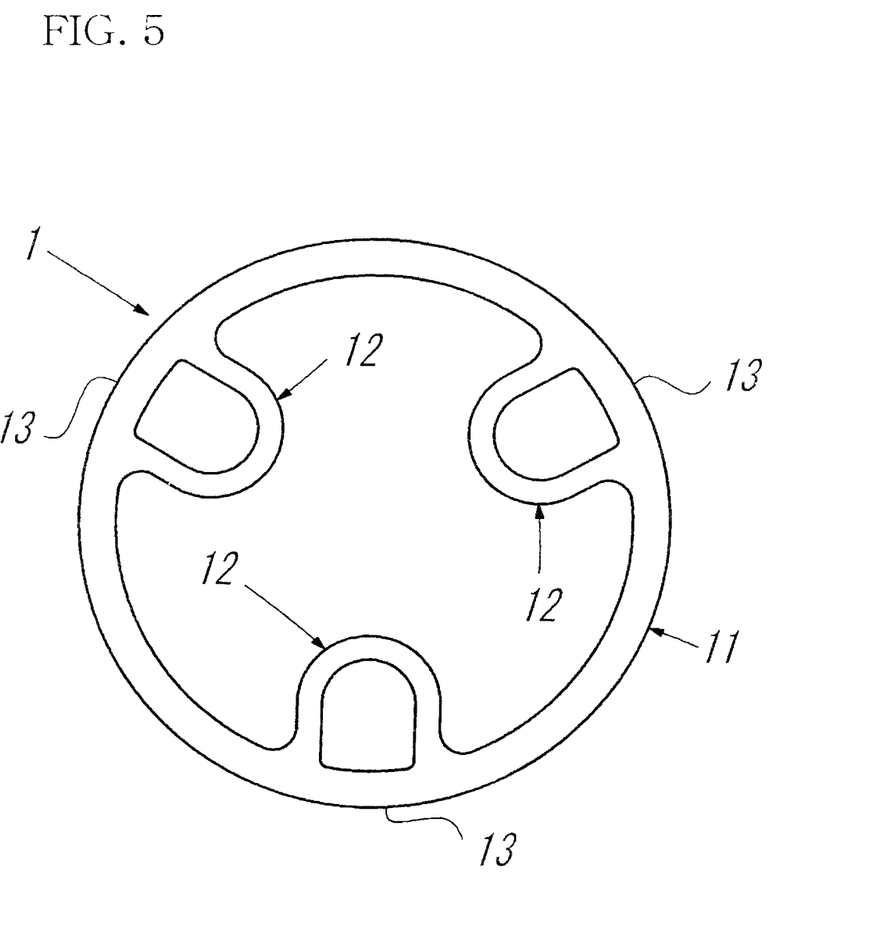
FIG. 5 is a front view showing the second example of the mode for carrying out the double pipes of this invention.

FIG. 5 is shows the second example of the mode for carrying out the double pipes of this invention.

The second example is constructed in such a way that the size of the inner pipe 12 of the first example is reduced and three inner pipes are arranged in a radial manner to the center of the outer pipe 11.

According to the second example, it is possible to make a compact collection of many fluid flowing passages. In addition, it is possible to increase an entire rigidity more than that of the first example and to increase an anti-twisting feature.

Next, referring to FIG. 6 to FIG. 9, the mode for working the coupling structure for the double pipe of this invention will be described.

Figure 6:
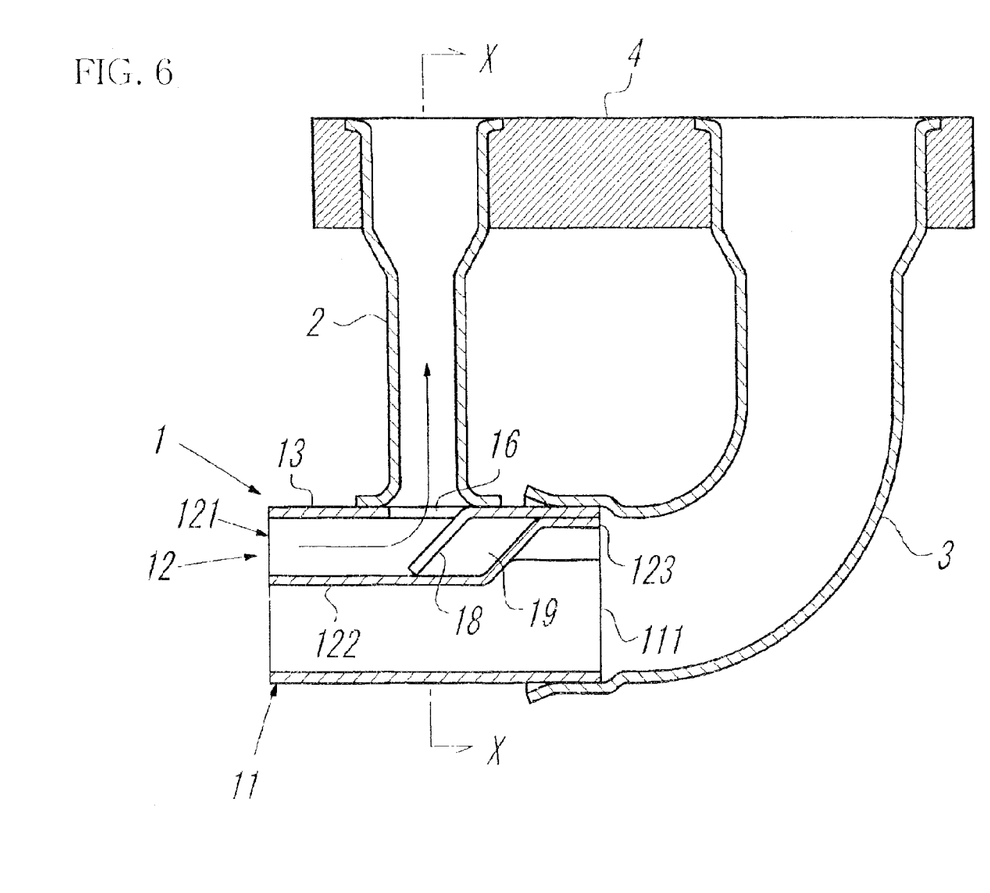
FIG. 6 is a longitudinal cross sectional view showing the mode for carrying out the coupling structure for the double pipes of this invention.

As shown in FIG. 6, this mode is constituted by each of the sections of the double pipe 1, a connecting pipe for inner pipe 2, a connecting pipe for outer pipe 3 and a connecting flange 4, respectively.

The double pipe 1 comprises the outer pipe 11 and the inner pipe 12.

Figure 8:
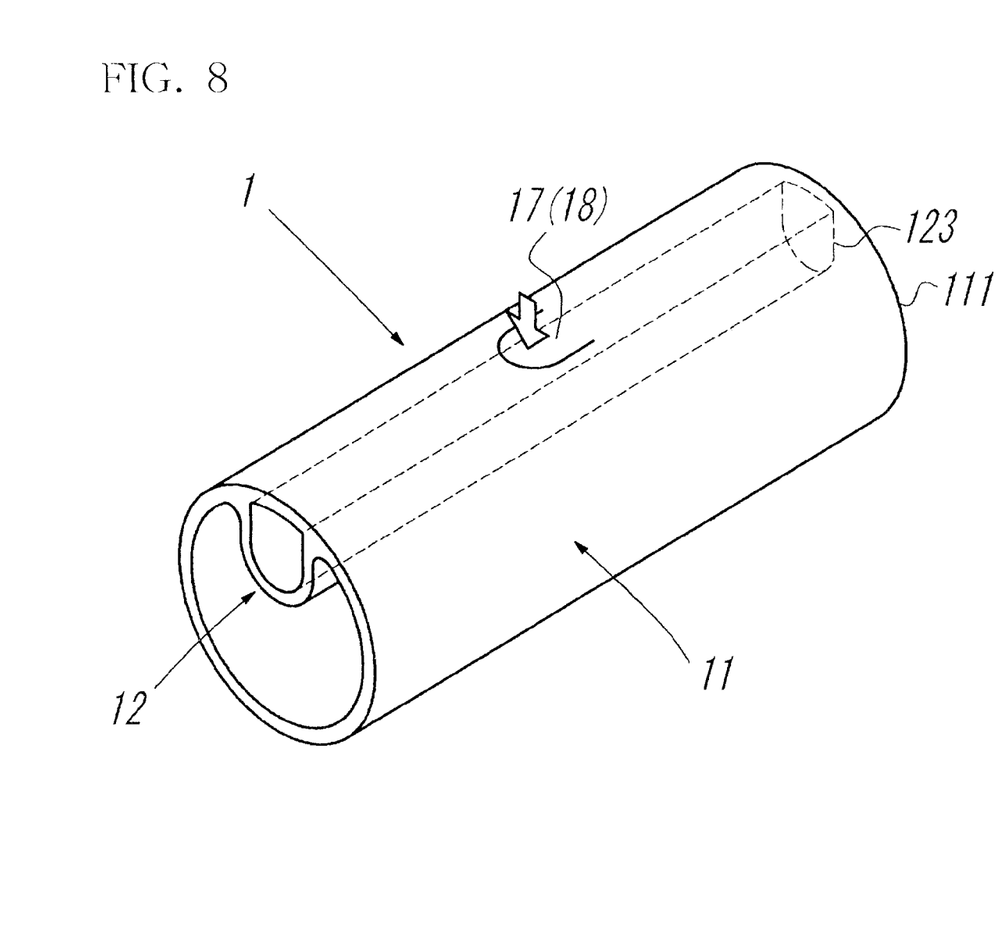
FIG. 8 is a perspective view showing the example for punching-out work in FIG. 6.
Figure 9:
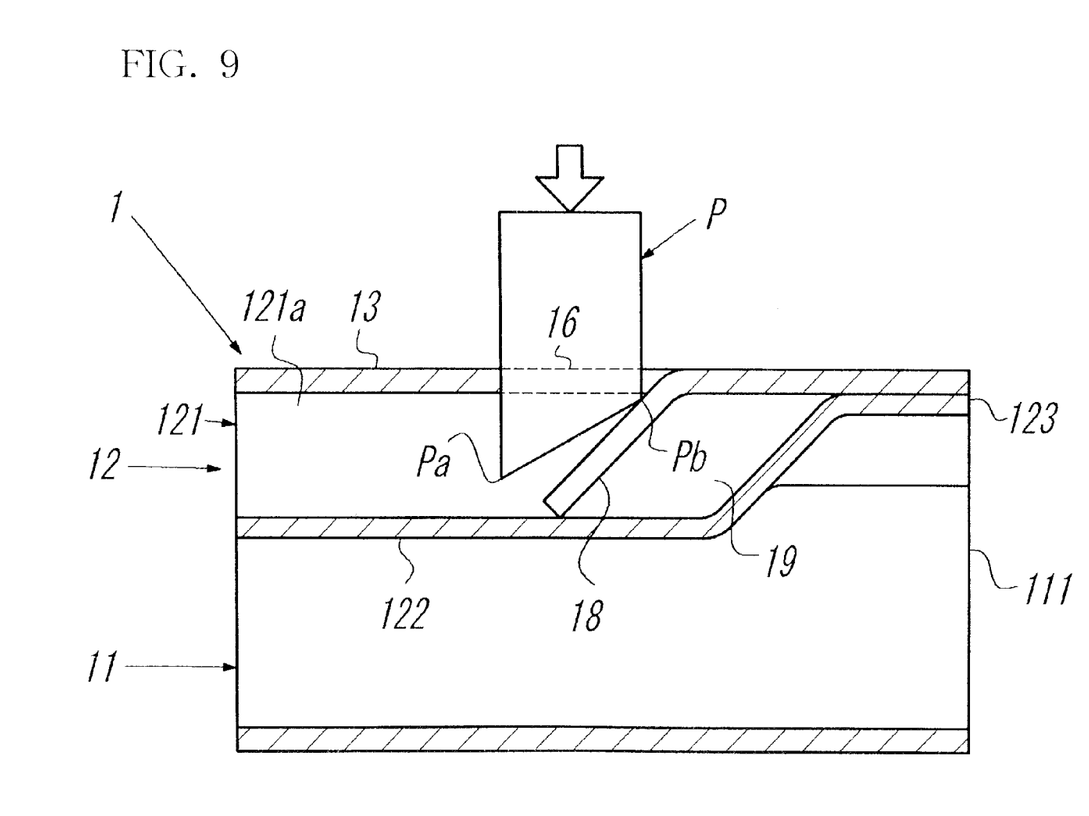
FIG. 9 is a expanded longitudinal cross sectional view in FIG. 8.

According to the double pipe, as shown in FIG. 8 and FIG. 9, the punch-P having a size in a range of space of the side walls 121 of the inner pipe 12 is properly selected when the pressing-type punching-out work is carried out for performing the connection of the inner pipe 12 to the common part 13 of the outer pipe 11 and the inner pipe 12. A shape of the cutting blade of this punch-P has a U-shape (see FIG. 8) at seen in its cutting plan view in regard to this double pipe and the base part-Pa of this U-shape is inclined (see FIG. 9) to protrude out of the opened end part-Pb of the U-shape. Further, the end edge of the opened end part-Pb of the U-shape of the punch-P is not provided with a blade having a cutting function.

The punch-P, as shown in FIG. 9, is pressed from outside the common part 13 toward the diametral direction of the outer pipe 11, the common part 13 is punched with the hole 16 for connecting operation to cause the cutting piece 18 generated during the punching operation to be pushed toward the deep direction (direction to the recess wall 122 of the inner pipe 12). Further, the punch-P in which of the opened end part-Pb of the U-shape is positioned at side for the end port 111 of the outer pipe 11 and the end port 123 of the inner pipe 12 which becomes the connecting ends.

At this time, because the interface part between the inside surface 121a of the side walls 121 of the inner pipe 12 and the common part 13 is formed into the small curved surface 14 and the punch-P cutting stress may easily be concentrated, the common part 13 is easily cut and the hcle 16 is positively formed. This hole 16 becomes a U-shape (a tongue-shape, a horseshoe shape) in view of a shape of cutting blade of the punch-P and the like and at the same time it becomes an incomplete punched hole where the opened end part of the U-shape is left as a not-yet cut portion at the common part 13. Accordingly, as this hole 16 is being punched, the cutting piece 18 is pushed into the inner pipe 12 in such a way that the base part of the U-shape is inclined around a fulcrum point of the opened end part of the U-shape and further protruded into the inner pipe 12. That is, the cutting piece 18 is arranged in an acute angle against an axis of the hole 16 and inclined toward the upstream side of fluid flowing at the inner pipe 12.

In addition, the inner pipe 12 is not damaged by the cutting piece 18 or the cutting piece 18 is not press contacted with inner pipe 12, because the cutting piece 18 pushed by the punch-P is guided to slide on the inside surface 121a the side walls 121 of the inner pipe 12 at its both sides.

In addition, since the base part of the U-shape that becomes an extremity end of the cutting piece 18 pushed by the punch-P is directed toward the recess wall 122 not more widely opened than the side walls 121 of the inner pipe 12, no useless space is formed between the cutting piece 18 and the inner pipe 12.

Accordingly, when the common part 13 of the outer pipe 11 and the inner pipe 12 is worked with the pressing-type punching-out work for connecting with the inner pipe 12, there occurs no possibility that any disadvantage caused by the cutting piece 18 is generated.

Further, the cutting piece 18 pushed into the inner pipe 12 is abutted against the side walls 121 and the recess wall 122 of the inner pipe 12. Due to this fact, brazing enables a substantial complete closing plug structure to be attained against the inner pipe 12.

Figure 7:
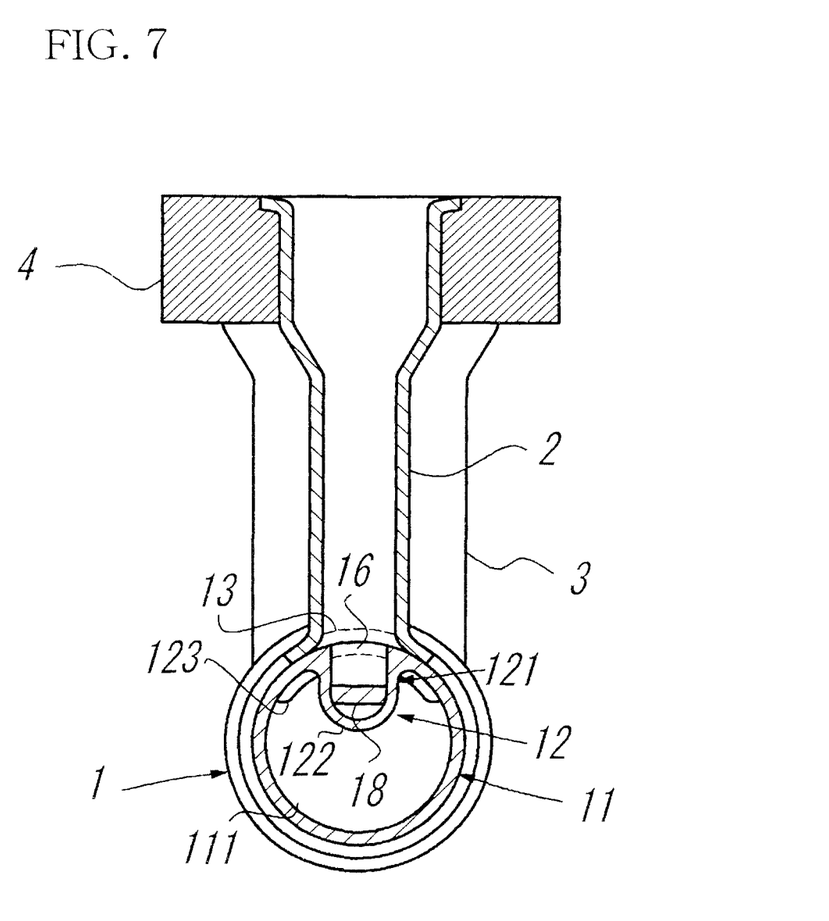
FIG. 7 is a cross sectional view of the X-X line in FIG. 1.

The connecting pipe for the inner pipe 2 is connected to the hole 16 by brazing as shown in FIG. 6 and FIG. 7. The connecting pipe for inner pipe 2 is connected to the connecting flange 4 and supported by the connecting flange. This connecting operation is a well-known technology itself for the coupling structure for the double pipe and can be easily carried out.

Further, the end port 123 of the inner pipe 12 is pressed in an arc form to the outer pipe 11 and the common part 13 by a crushing work and brazed. As a result, a clearance 19 is formed between the end port 123 of the inner pipe 12 and the cutting piece 18. This clearance 19 becomes a substantial complete closed state.

Further, the connecting pipe for outer pipe 3 is fitting and connected to the end port 111 of the outer pipe 11 by brazing. The connecting pipe for outer pipe 3 as like same to the connecting pipe for inner pipe 2 is connected and supported by the connecting flange 4.

Application of this mode causes the fluid flowing through the inner pipe 12 and flowing into the connecting pipe for inner pipe 2 to be guided by the cutting piece 18 and then a smooth changing of direction in flowing is carried out. In addition, the fluid does not stay disturb near the cutting piece 18 because the clearance 19 behind of the cutting piece 18 becomes a substantial complete closed state. Accordingly, a high level flowing characteristic can be assured in the fluid flowing in the inner pipe 12 and the connecting pipe for inner pipe 2.

In addition to each of the examples illustrated above, it is possible to change the high pressure pipe of the outer pipe 11 and the low pressure pipe of the inner pipe 12 of the double pipe 1 and along this changing, both wall thicknesses-a and wall thicknesses-b can also be properly changed.

Further, the outer pipe 11 of the double pipe 1 can be applied in the case of non-perfect circle.

Further, it is also possible to make the number of the inner pipe 12 arranged in the outer pipe 11 of the double pipe 1 to be more than 2 or 4.

Further, it is also possible to make a shape of the recess wall 122 of the inner pipe 12 of the double pipe 1 to be a shape other than a semi-circular shape.

Further, as to the inclination angle of the cutting piece 18, it is possible that a concave clearance 19 is formed at the end port 123 of the inner pipe 12 and it is set within a range not forming any new staying section for fluid (up to an angle where it becomes the axis of the hole 16 in parallel).

Example for Embodiment

In the case that the mode of the double pipe and the coupling structure for the pipe of this invention are used as a refrigerant passage for a vehicle-mounted air conditioner, an outer diameter of the outer pipe 11 of the double pipe 1 is 19 mm, the wall thickness-a is 1.2 mm, the wall thickness-b of the inner pipe 12 of the double pipe 1 is 1.0 mm, a space at the inside surface 121a of the side walls 121 is 5 mm and a center of the recess wall 122 is set a position spaced apart by 4.61 mm from a center of the outer pipe 11.

Industrial Applicability

In the case that the mode of the double pipe and the coupling structure for the pipe of this invention can be applied to use not only a refrigerant passage for a vehicle-mounted air conditioner as also the other theme, it is also possible to the case this diameter is more lager.

The invention claimed is:

1. A double pipe in which an inner pipe is arranged inside an outer pipe
    a portion of the outer pipe and a portion of the inner pipe partially made common and integrally formed with each other,
    the inner pipe having parallel side walls spaced apart a selected distance from one another and extending from the common part of the outer pipe and the inner pipe in a diametral direction of the outer pipe, and
    a recess wall at an interior end of the side walls, the recess wall facing the common part of the outer pipe and the inner pipe, the recess wall not expanded more than the distance between the parallel side walls.

2. The double pipe according to claim 1, wherein the recess wall of the inner pipe has a semi-circular shape which protrudes outwardly of a space defined between the side walls.

3. The double pipe according to claim 1, having a curved transition surface between an outer surface of each inner pipe side wall and an inner surface of the outer pipe.

4. The double pipe according to claim 2, having a curved transition surface between an outer surface of each inner pipe side wall and an inner surface of the outer pipe.

5. A coupling structure for connecting to a double pipe wherein,
    an inner pipe is arranged at the inside of an outer pipe;
    a portion of the outer pipe and a portion of the inner pipe partially made common and integrally formed to each other;
    the inner pipe has substantially parallel side walls extending from a common part of the outer pipe and the inner pipe to the diametral direction of the outer pipe,
    a recess wall at an interior end of the side walls, the recess wall facing the common part of the outer pipe and the inner pipe, the recess wall not expanded more than a distance between the parallel side walls;
    the common part of the outer pipe and the inner pipe punched to have a connecting hole;
    the connecting hole made as an incomplete punched hole having a partially not-yet cut portion; and
    a cutting piece formed with the hole extending from the common part of the outer pipe and the inner pipe to protrude into the inside part of the inner pipe.

6. The coupling structure for the double pipe according to claim 5, wherein the cutting piece is inclined at an upstream side of flow of fluid in the inner pipe to have an acute angle relative to an axis of the connecting hole.

7. The coupling structure for the double pipe according to claim 5, wherein the cutting piece is abutted against the side walls and the recess wall of the inner pipe.

8. The coupling structure for the double pipe according to claim 6, wherein the cutting piece is abutted against the side walls and the recess wall of the inner pipe.

9. A double pipe organization comprising:
    a outer pipe having an inner pipe therein, a wall portion of the outer pipe and a wall portion of the inner pipe integrally formed with one another to define a common pipe wall;
    the inner pipe having parallel side walls spaced a selected distance from one another and extending from the common pipe wall in a direction toward an interior wall portion of the outer pipe opposite the common pipe wall; and
    a recess wall extending between interior ends of the side walls and having an interior surface facing the common pipe wall, the recess wall not extending beyond the selected distance between the spaced apart parallel side walls of the inner pipe.

10. The double pipe organization of claim 9 wherein the recess wall of the inner pipe has a semi-circular shape.

11. The double pipe organization of claim 9 further comprising a curved transition surface between an outward facing surface of each inner pipe wall and an inward facing surface of the outer pipe.

* * * * *